April 29, 1958 G. J. Z. PICHON 2,832,198
HYDRAULIC ROTARY PUMP AND MOTOR TRANSMISSION
Filed March 15, 1954 4 Sheets-Sheet 1
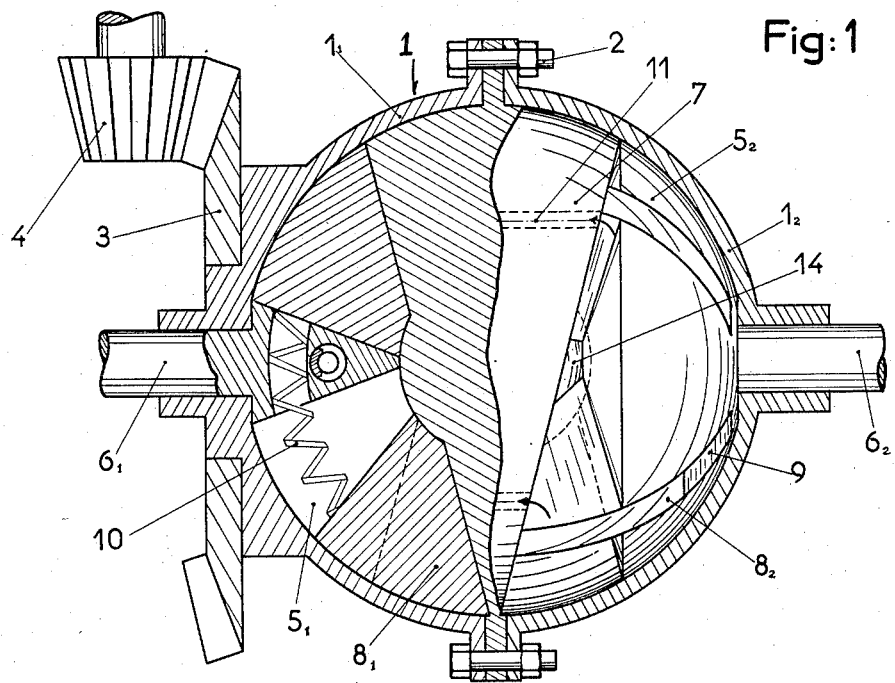
Fig: 1
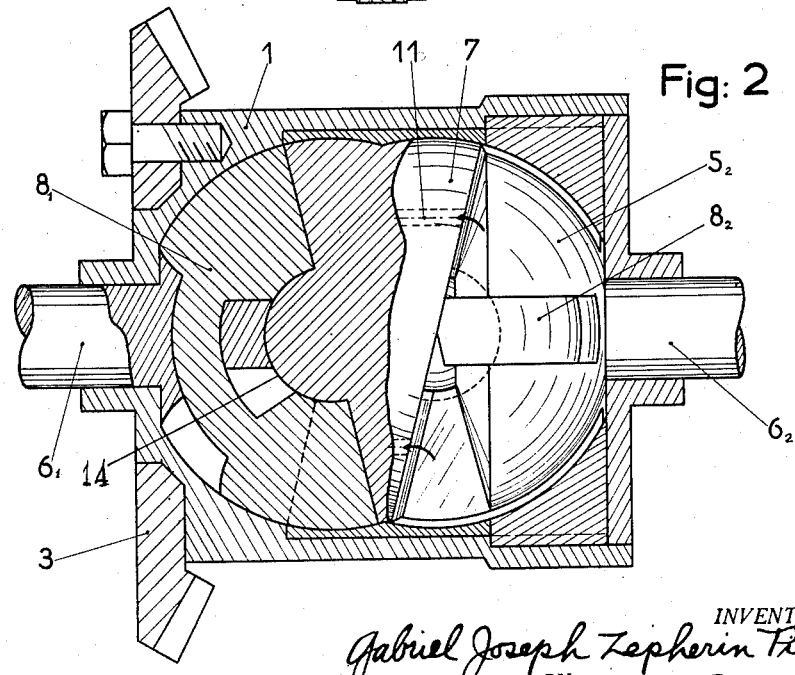
Fig: 2
INVENTOR
Gabriel Joseph Zepherin Pichon
BY
J. E. Trabucco
Attorney

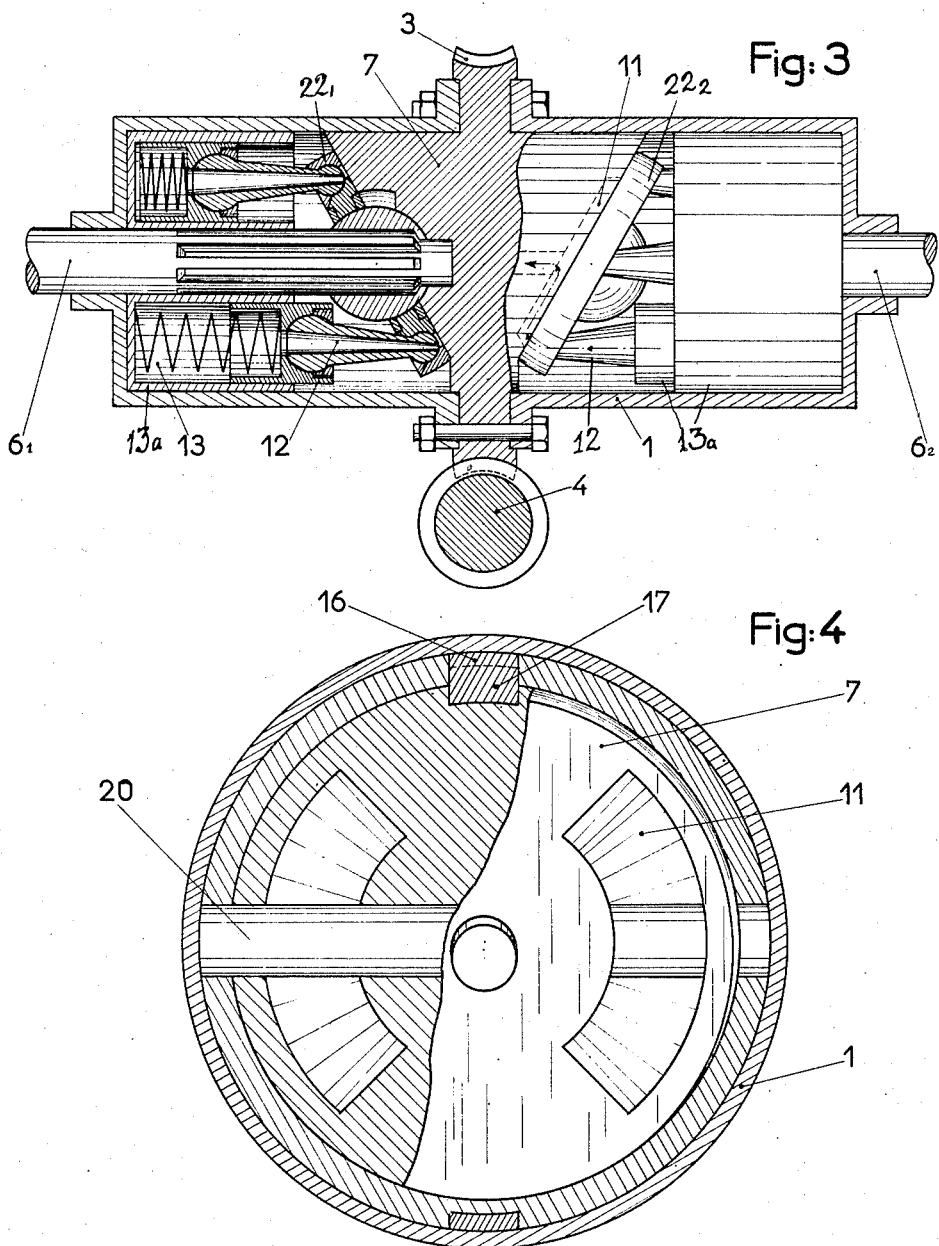

April 29, 1958 G. J. Z. PICHON 2,832,198
HYDRAULIC ROTARY PUMP AND MOTOR TRANSMISSION
Filed March 15, 1954 4 Sheets-Sheet 4
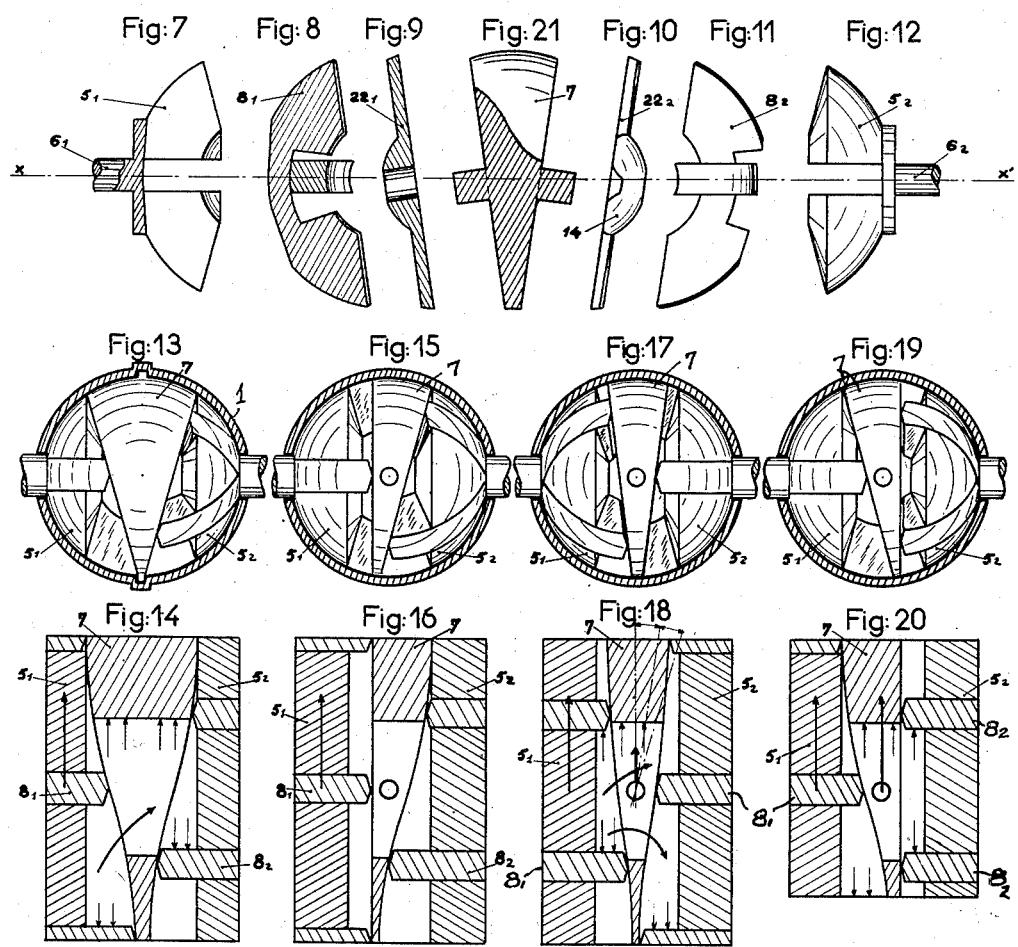

United States Patent Office 2,832,198
Patented Apr. 29, 1958

2,832,198

HYDRAULIC ROTARY PUMP AND MOTOR TRANSMISSION

Gabriel Joseph Zephirin Pichon, Besançon, France

Application March 15, 1954, Serial No. 416,346

3 Claims. (Cl. 60—53)

This invention relates to a novel torque converter and is based upon an hydraulic differential principle.

The hydraulic differential mechanism embodying the present invention comprises two (2) pump rotors having slots containing slidable vanes, both pump rotors having axially aligned driven shafts extending through the ends of a rotatable casing driven by a prime mover. The casing carries a centrally disposed cam having oppositely inclined cam surfaces which are engaged by the slidable vanes, and extending through the cam are fluid passages which connect fluid work chambers located at opposite sides of the cam between the cam surfaces and the pump rotors. Movement of the vanes and the change in volume of the fluid work chambers is obtained by the sliding action of such vanes over the cam surfaces as the cam rotates with the casing. When the casing and the cam are rotated by a prime mover, the variation in thickness of the cam exerts pressure on the liquid in the fluid work chambers so that the vanes of the pump rotors are activated. Since each set of vanes is constructed and arranged to extend freely toward and retract as the cam changes its position when rotated, each set of vanes will react inversely but with equal force relative to the other set of such vanes, this being possible because of the free flow of fluid through the cam from one work chamber to another. The cam functions in the manner of a sun gear and the pump rotors as planetary gears in a differential mechanism.

The torque converter embodying the principles described above comprises an outer rotatable casing connected to a take-off member or driving pinion gear, a pump rotor in one end of the casing, a motor reactor in the opposite end of the casing and a variable cam member having transverse fluid passages, the cam being carried by the casing and arranged between the pump rotor and the motor reactor and forming a pump work chamber with the pump rotor and a motor work chamber with the motor reactor, whereby the speed of the casing is regulated by changing the position of the cam member, the capacity of the two chambers being varied inversely thereby.

The primary objects of the present invention are the provision of a novel hydraulic differential mechanism or clutch and a novel torque converter of the kind characterized.

Other and further objects of my invention will be pointed out hereinafter or will be indicated in the appended claims or will be obvious to one skilled in the art upon an understanding of the present disclosure. For the purpose of this application, I have elected to show herein certain forms and details of an hydraulic differential system representative of my invention; it is to be understood, however, that the embodiment of my invention herein shown and described is for purposes of illustration only and that therefore it is not to be regarded as exhaustive of the variations of the invention in the art.

In the accompanying drawings:

Fig. 1 is an elevational view, partly in section, of an hydraulic differential system in spherical form, such system comprising rotary pumps equipped with vanes and return springs;

Fig. 2 is an elevational view, partly in section, of an hydraulic differential system embodying another form wherein the return springs are eliminated;

Fig. 3 is an elevational view, partly in section, showing my differential system embodied in cylindrical form in which piston pumps are provided;

Fig. 4 is a partial sectional view taken on the line a—b of Fig. 5, showing the left half in section and the right half in elevation, and also showing the liquid passages provided between the pumps;

Fig. 6 is a similar view on a reduced scale of a torque converter with certain parts eliminated;

Figure 5:
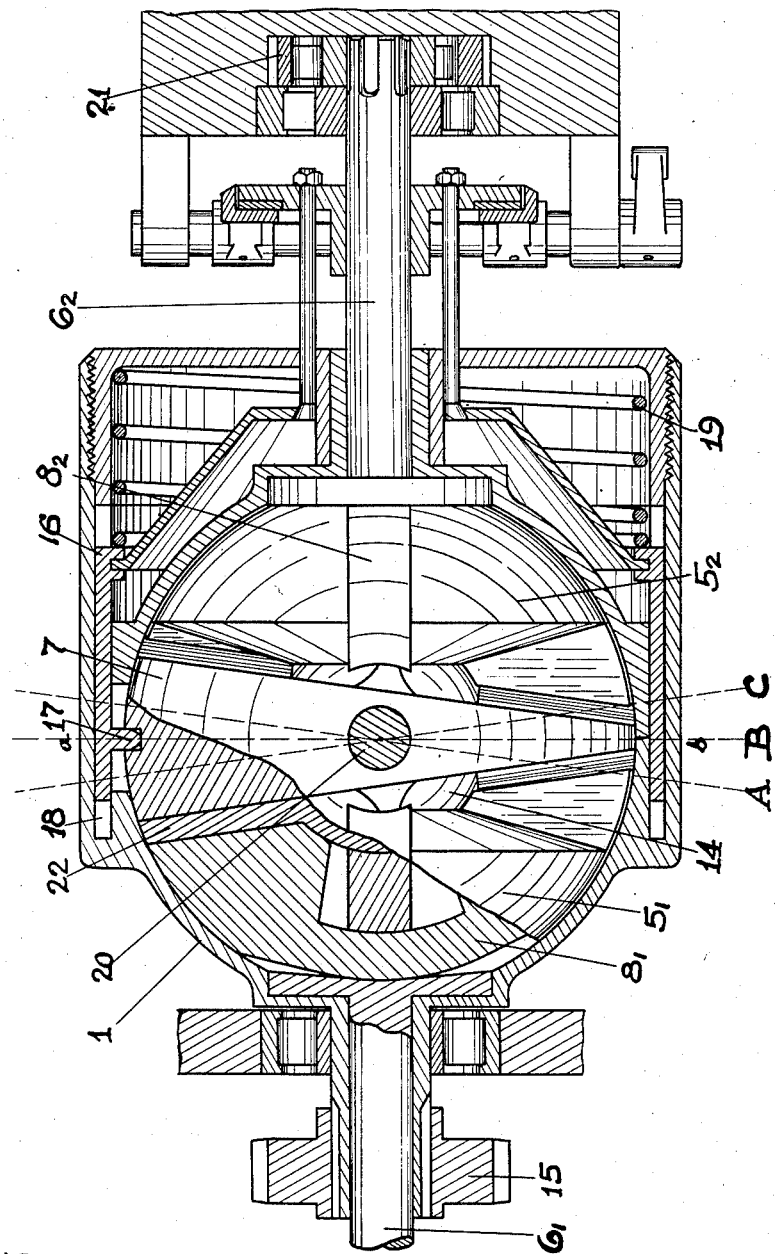
Fig. 5 is a sectional view of a progressive torque converter embodying the hydraulic differential principle, showing parts in elevation.

Figs. 7 to 12, inclusive, and Figure 21 show disassembled parts of the torque converter shown in Fig. 6, it being noted that Figs. 6 to 9 and Figure 21 show certain parts in section and Figs. 10 to 12 show parts in elevation.

In the Figs. 7 to 12, Fig. 7 shows the driving shaft $6'$ and the semi-spherical segment or pump rotor $5'$ which is to be fitted with the driving vanes $8_1$; Fig. 8 shows a pair of driving vanes $8_1$; Fig. 9 shows a cross-shaped sliding connector $22_1$ insuring a tight contact between the vanes and the cam, the said connector following the oscillating cam 7 around its axle; Fig. 10 shows a similar cross-shaped sliding connector $22_2$ contacting the opposite side of the cam, but associated with the reacting vanes; Fig. 11 shows the pair of reacting vanes $8_2$; Fig. 12 shows the semi-spherical segment $5_2$ which is to be fitted with the reacting vanes.

Comparing the torque converter to an epicyclic system, the parts shown in Figs. 7, 8 and 9 correspond to the driving sun gear turning at the speed of the driving shaft; the cam 7 the planetary gear for transmitting rotary movement through the casing to which it is keyed, to a driven gear take-off member 15; the parts shown in Figs. 10, 11 and 12 correspond to the reacting gears, it being noted that they do not rotate when the gear ratio is reduced but rotate with the whole when the gear ratio is not reduced.

Fig. 13 is a diagrammatic view of the differential system;

Fig. 14 illustrates diagrammatically the cylindrical mercatorial projection of the differential system shown in Fig. 13, showing the work chambers and the direction of the pressures;

Figs. 15 and 16 are similar to Figs. 13 and 14, respectively, and they show the torque converter in neutral; the A position of Fig. 5;

Figs. 17 and 18 are also similar views to Figs. 13 and 14, respectively, and they show the parts when the gear ratio is reduced one-half (½), the B position of Fig. 5;

Figs. 19 and 20 are also similar to Figs. 13 and 14, respectively, and they show the apparatus when the converter is in direct drive, the C position of Fig. 5.

The hydraulic differential system shown in Fig. 1 comprises a casing 1 of substantially spherical shape, such casing being formed by securing two (2) hollow, semi-spherical shells $1_1$ and $1_2$ together by means such as bolts 2. A large tooth crown gear 3 is securely attached to the casing 1 by suitable means, and a pinion gear 4 normally connected to a source of power is adapted to rotate the crown gear and the casing.

Two (2) semi-spherical pump rotors or segments $5_1$ and $5_2$ mounted in opposite ends of the casing 1 are driven members operating as planetaries, and shafts $6_1$ and $6_2$ positioned in axial alignment and extending through suitable bearings in opposite ends of the casing are secured centrally to the semi-spherical pump rotors $5_1$ and $5_2$, respectively. The semi-spherical pump rotors $5_1$ and $5_2$ are equipped, respectively, with sliding vanes $8_1$ and $8_2$, which are held in engaging relationship with the lateral converging faces or cam surfaces of a cam 7, the said cam being interposed between these two (2) semi-spherical pump rotors, and such cam being fixedly secured by suitable means to the casing. The cam surfaces of the cam 7 have semi-spherical protuberances 14 arranged centrally thereon. The vanes $8_1$ and $8_2$ are slidably mounted in suitable slots 9 provided in the semi-spherical members $5_1$ and $5_2$, respectively. The vanes $8_1$ and $8_2$ engage with the cam surfaces of the cam 7 and coiled compression springs 10 also mounted in the slots 9 are arranged to return the vanes outwardly toward the cam after the latter has forced their retraction into the slots. Thus the outer ends of the vanes are held in engagement with the cam surfaces and the semi-spherical protuberances 14.

Fluid work chambers filled with a suitable fluid are provided in the casing at opposite sides of the cam, between the cam surfaces and the pump rotors $5_1$ and $5_2$. Liquid passageways 11 extending transversely through the cam 7 connect the two (2) fluid work chambers and allow fluid to flow back and forth from one to another.

The form of the cam 7 is determined by a dihedral cutting of a section of either a sphere (Fig. 1) or by another volume of revolution made by using a barrel shape, a cylinder (Fig. 3) or by another suitable volume of revolution required to fit a specific use.

The variable volume of the fluid work chambers of the pumps is determined by the space between the cam 7, the semi-spherical pump rotors $5_1$ and $5_2$, their respective vanes $8_1$ and $8_2$ and the casing 1.

The differential system described above operates as follows: The casing 1 driven by the pinion gear 4 through the crown gear 3 drives or rotates the cam 7. The cam, by reason of the variance in its thickness exerts sufficient pressure on the vanes $8_1$ and $8_2$ to actuate or rotate the pump rotors $5_1$ and $5_2$ and the shafts $6_1$ and $6_2$.

The differential movement is produced by the passage of liquid from one fluid work chamber into another through the passageways 11 in the cam 7. Stated in another way, a vane $8_1$ or $8_2$ sliding on the cam surface of the cam 7 reduces (or increases, depending upon the direction of movement) the volume left for the liquid between the cam 7 and a semi-spherical pump rotor $5_1$ or $5_2$. From this variation of the volumes of the fluid work chambers proceed the variations in the reciprocal speeds of the shafts $6_1$ and $6_2$ of the differential mechanism. If the opposed resistance of the two (2) shafts is equal, they will turn at the same speed. If the opposed resistance of the two shafts is unequal, there will be a reciprocal movement of the semi-spherical pump rotors $5_1$ and $5_2$ with respect to the cam, and this will take place due to the passage of liquid through the passageways 11 in the cam 7 from one fluid work chamber to another.

The speed gained by the pump rotor $5_1$ is equal to the speed lost by the pump rotor $5_2$ and vice versa. In formulating an equation, let N represent the number of turns of the casing 1. The shaft $6_1$, which is turning faster, makes $N+n$ turns, whereas the shaft $6_2$, which is turning slower than the case, makes only $N-n$ turns; we thus obtain the equation $(N+n)+(N-n)=2N$. The sum of the number of turns of the shafts $6_1$ and $6_2$ is constantly equal to twice the number of turns of the casing.

The hydraulic differential system shown in Fig. 2 is formed by having vanes united in opposing pairs, with ends thereof in contact with the cam surfaces of the cam 7, such surfaces being formed with semi-spherical protuberances 14. This system is adapted for use with automobiles.

The hydraulic differential system shown in Fig. 3 contains the same parts as the form shown in Fig. 1 with the difference that the vanes carried by the pump rotors are replaced by hollow pistons 13 which slide in cylinders 13a. The cam 7 is rotated through gears 3 and 4 or other suitable means. The transfer of liquid from one fluid work chamber to another is made through the hollow pistons 13, through tubular connecting rods 12 and through transverse openings in the cam 7. The inner ends of the tubular connecting rods movably fit in sockets carried by sliding connectors $22_1$ and $22_2$, which engage with the cam surfaces of the cam 7. The operation of the hydraulic differential mechanism shown in Fig. 3 functions similarly to the device shown in Fig. 1.

The angle of the cam can be increased or lessened depending on the desire for easy displacement of the planetaries, or a powerful drive accompanied by a small relative movement of these planetaries.

The cylindrical form may be used with vanes. Systems using vanes can be built into mixed systems, that is to say, thick vanes functioning at the same time by their surfaces and their volume functioning as pistons in their housing.

It is to be noted that the calibration of the fluid channels 11 will depend upon the viscosity of the liquid, permitting the limitation of the radial relative speed of the two planetaries by augmenting the coupling force on the particular planetary which is turning the slowest.

In Figs. 4 and 5 the hydraulic differential principle described above is shown as applied to a progressive torque converter. The cam 7 is made by sectioning a sphere with a dihedral. The largest part of the cam makes an arc equal to thirty (30) degrees, for example, which will permit the pivoting of this cam for fifteen (15) degrees about an axis 20 perpendicular to the main axis of rotation, provided that the width of the spherical zone found between the two (2) semi-spherical segments $5_1$ and $5_2$ is an arc of forty-five (45) degrees. A plane bisecting the cam 7 can therefore occupy any of the positions between A, B and C (Fig. 5). The cam 7 is provided centrally at its cam surfaces with semi-spherical protuberances 14 that engage with the vanes $8_1$ and $8_2$.

According to the requisites incident to a particular use or requirements of the cam, the axis 20 on which the cam 7 pivots can be placed in line with the plane of either of its cam surfaces or between the two (2) planes of its cam surfaces, as for instance in the bisector plane. It is also possible to have the cam made in two (2) parts, with each cam surface having its own axis to pivot on, while at the same time conserving the same angle between the two of them.

The torque converter shown on Fig. 5 operates as follows: The left drive shaft $6_1$ and its connected semi-spherical segment or pump rotor $5_1$ function as a sun gear and motion is transferred through the cam 7 and the casing 1 to a pinion gear or take-off 15, it being noted that the cam is connected to the casing, and the casing is keyed to the pinion gear. The right shaft $6_2$ and its associated semi-spherical segment $5_2$ react, as the fulcrum of a lever, on the one way free wheeling ring. They constitute a motor reactor.

Illustrating the various positions A, B, and C of Fig. 5, reference will be made to the diagrammatic Figs. 13 to 20. In position A, Figs. 15 and 16, the bisector plane of the cam 7 will be in position A, the left cam surface will be perpendicular to the driving shaft. The sliding action of the left vanes $8_1$ and the semi-spherical pump rotor $5_1$ over the perpendicular left cam surface will cause no axial movement of these vanes and pump rotor. The driving pump rotor will be in neutral, the volumes will be constant and the output zero.

Position A to C, Figs. 15 to 20: As soon as the cam is oscillating on its axis 20 toward the position B, the driving vanes $8_1$ will begin this motion of eclipse and the volumetric differential system will come into play and transmit pressure through the fluid channels 11 in the cam 7 onto the reactor vanes $8_2$ at the right of the cam. The right reactor segment $5_2$ is held immobile by the action of the free wheeling ring 21. The pressure thus applied actuates the cam, the output of the driving pump increases, whereas that of the reacting pump will proportionally diminish, but inversely.

Position B: Once the cam 7 comes to position B (Figs. 17 and 18), it will turn at half the speed of the driving shaft $6_1$, the pinion gear 15 and the casing 1. The two (2) pumps will have the same output.

Position C: As the cam is further oscillated toward the position C, the speed of the cam, the casing and the pinion gear 15 approach the speed of the driving shaft, and finally when such position C is reached, these become equal. The right cam surface of the cam is then perpendicular to the general axis of rotation, as illustrated in Figs. 19 and 20. The exposed surfaces of the reacting vanes $8_2$ are equal to each other, and the pressures are counterbalanced. At this position the semi-spherical reactor segment $5_2$ and its connected shaft $6_2$ are driven by the ordinary friction of the assembly. The free wheeling ring 21 associated with the shaft $6_2$ fulfills its function. The apparatus will then be in a direct drive, without any loss of power and without any wear to the parts. The ouptut of the reacting pump will be zero.

In this embodiment the control of the cam, so as to move it to positions A, B and C, is obtained by the operation of a sleeve 16 to which is attached a key 17 that connects with the cam 7, thereby making it possible to move the cam from one position to another by sliding such key within a channel 18 formed in the casing 1. A spiral compression spring 19 normally holds the cam 7 in the position C, direct drive.

It is understood that the examples shown and described herein are merely illustrative of the principles of the present invention, and in this respect it is to be understood that my invention may embody various other forms utilizing the said principles.

What I claim is:

1. In a variable hydraulic transmission, a driven casing, a driving pump rotor member rotatably mounted in one end of the casing, a motor reactor member rotatably mounted in the other end of the casing and connected to a free wheeling device, a variable cam member carried by the casing and arranged in spaced relation between the driving pump rotor member and the motor reactor member, the said cam member having converging cam surfaces arranged in locations facing but spaced from the rotor member and the reactor member, the said cam being mounted for variable pivotal adjustment about an axis at right angles to the rotative axis of the casing, the said casing having a fluid containing pump work chamber located between the cam and the rotor member and a fluid containing motor work chamber located between the cam and the reactor member, the said cam having fluid passages connecting the pump work chamber and the motor work chamber, and a plurality of slidable vanes carried by the rotor member and the reactor member, the said vanes being in slidable engagement with the cam surfaces.

2. In a variable hydraulic transmission, the combination set forth in claim 1, together with spring means maintaining the vanes in engagement with the cam surfaces.

3. In a variable hydraulic transmission, the combination set forth in claim 1, together with means adjusting the cam to different operating positions.

References Cited in the file of this patent
UNITED STATES PATENTS

| | | |
|---|---|---|
| 1,429,100 | Ross | Sept. 12, 1922 |
| 1,499,480 | Seeck | July 1, 1924 |
| 2,401,376 | Sherman | June 4, 1946 |
| 2,593,457 | Jastrzebski | Apr. 22, 1952 |